United States Patent

Wojcikowski

[11] 3,877,485
[45] Apr. 15, 1975

[54] FLUIDIC SENSOR
[75] Inventor: Richard J. Wojcikowski, Toledo, Ohio
[73] Assignee: Dana Corporation, Toledo, Ohio
[22] Filed: June 15, 1973
[21] Appl. No.: 370,274

[52] U.S. Cl. ............... 137/829; 73/37.5; 73/37.7; 137/841; 137/83
[51] Int. Cl. .............................................. F15c 1/10
[58] Field of Search ............ 137/842, 83, 805, 829, 137/803, 839, 841, 835, 836; 73/37.6, 37.7, 37.5, 37.8; 33/DIG. 2

[56] References Cited
UNITED STATES PATENTS

| 3,302,887 | 2/1967 | Holmes et al. | 137/83 X |
| 3,340,886 | 9/1967 | Jacobsen | 137/83 |
| 3,397,713 | 8/1968 | Warren | 137/835 |
| 3,452,769 | 7/1969 | Jones et al. | 137/829 X |
| 3,563,484 | 2/1971 | Bray, Jr. | 137/805 X |
| 3,580,265 | 5/1971 | Horacek | 137/836 |
| 3,654,945 | 4/1972 | Soviche et al. | 137/805 |
| 3,677,276 | 7/1972 | Kopera | 137/83 |
| 3,692,037 | 9/1972 | Pinkstaff | 137/83 |

FOREIGN PATENTS OR APPLICATIONS

| 1,496,301 | 8/1967 | France | 137/842 |

Primary Examiner—William R. Cline
Attorney, Agent, or Firm—Robert E. Pollock

[57] ABSTRACT

A fluidic sensor having a rectangular surface is utilized to sense the presence of objects. The sensor body has a fluid inlet and a fluid outlet adjacent the surface which are in communication with an emitter port and a receiver port, respectively. The sensor is utilized with a fluidic gate system to sense the presence or absence of the sheet material, cylindrical objects or objects having other shapes.

6 Claims, 11 Drawing Figures

FLUIDIC SENSOR

BACKGROUND OF THE INVENTION

At the present time, there are several fluidic sensor devices which are commercially available. However, many of the prior art fluidic sensors have severe limitations when they are utilized with, for example, a metal working press. In such a use, a piece of sheet material, for example a piece of sheet metal, is being positioned in the press. With many prior art sensors, the sheet material must be carefully positioned at a known target spacing. It has been found that if the sheet metal is slightly warped in the vertical plane or is angularly mispositioned by the machine operator in the horizontal plane, the sensors have such a narrow range, for example with respect to material thickness limitations, that they do not operate correctly.

One type of prior art sensor is a single jet type sensor which is based on reflecting part or all of a conical air stream back toward the source. The conical air stream is convergent of low power and high gain, where gain is the ratio of air pressure received to the air pressure transmitted, based on a given flow ratio.

Examples of prior art conical flow sensors are, for examples, shown in U.S. Pats. Nos. 3,371,517, 3,422,666 and 3,460,375.

Another prior art unit which is used in sensing sheet material is a "C" shaped sensor having opposing legs. Holes or nozzles are located at the outer ends of the legs and are directly opposite to one another. One nozzle emits high pressure air across the gap and into the receiver nozzle. The recovery or gain in this type of device is relatively high. However, this type of sensor is unsuitable for use in a press operation because of structural interference problems. Examples of this type of sensor are shown in U.S. Pats. Nos. 2,539,131, 2,794,444 and 3,677,276.

The fluidic sensor, according to the present invention, solves many of the problems encountered in prior art sensors when used in connection with, for example, a press operation. The present fluidic sensor does not interfere with the structural apparatus of the press and still maintains a relatively high gain. Therefore, the present fluidic sensor has a large target range which accommodates slightly warped sheet material and slight accidental misalignment of the sheet material by the operator.

It has been found that when utilizing fluidic sensors, according to the present invention, the scrap rate of a press operation is substantially lowered.

It has also been found that the fluidic sensors may be utilized in sensing round objects or objects having other configurations.

SUMMARY OF THE INVENTION

The present invention relates to a fluidic sensor having a large range or target area which is particularly adaptable to a press operation to sense the presence or absence of sheet material.

The fluidic sensor includes a sensor body which defines a longitudinally extending surface. The sheet material is positioned within the press adjacent the surface of the sensor body and the fluidic sensor senses the presence or absence of the sheet material within the press.

The sensor body has a fluid inlet which is in communication with an emitter port which is located adjacent a lower portion of the surface. The body also has a fluid outlet which is in communication with a receiver port adjacent an upper portion of the surface.

DESCRIPTION OF THE PREFERRED EMBODIMENTS

Figure 1:
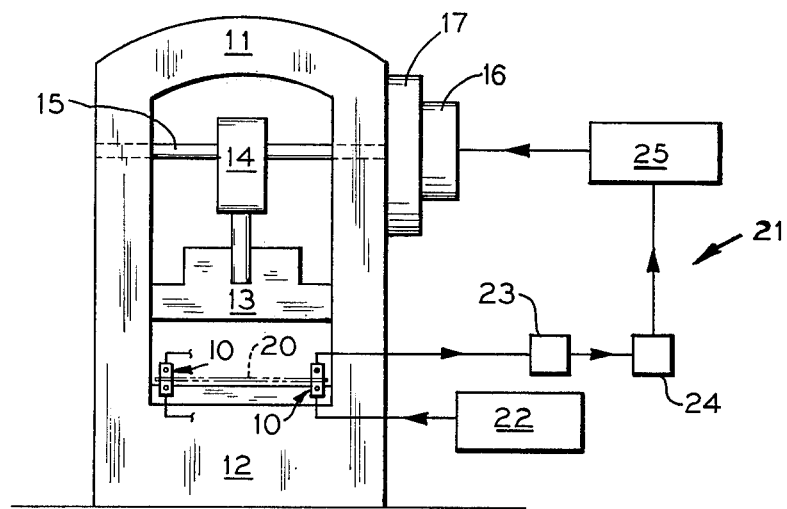
FIG. 1 is a diagrammatic view showing sensors according to the present invention utilized in a press operation.
Figures 2, 3:
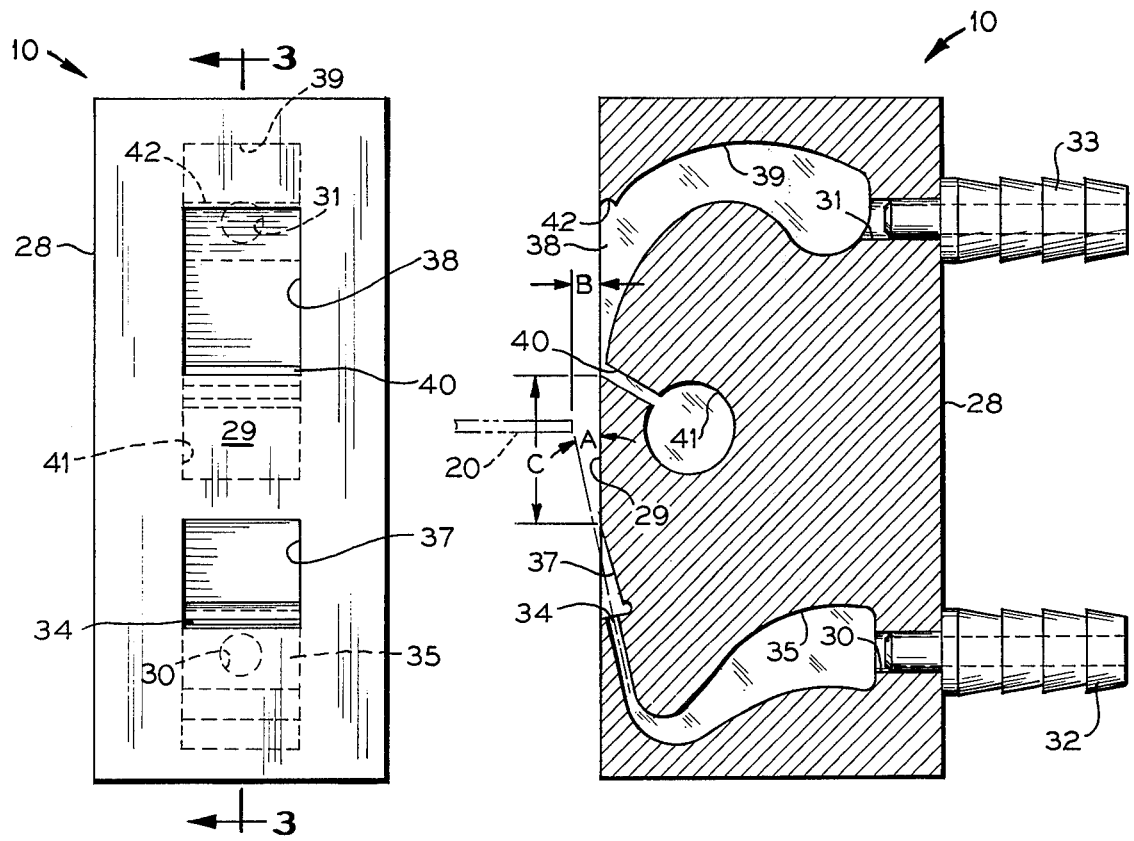
FIG. 2 is an enlarged front end view of a fluidic sensor according to the present invention.
FIG. 3 is a sectional view taken along the line 3—3 of FIG. 2.

Referring to FIGS. 2 and 3, a fluidic sensor, according to the present invention, is generally indicated by the reference number 10. A plurality of fluidic sensors 10 may be utilized in connection with a press 11 (see FIG. 1). The press 11 includes a bed 12 and a vertically reciprocal ram 13. The ram 13 is carried by a crank mechanism 14 which is eccentrically mounted on a shaft 15. Drive means, generally indicated by the reference number 16, are operatively connected to the shaft 15 through a clutch brake 17.

A piece of sheet material 20 is positioned on a die which is supported on the press bed 12. The presence or absence of the sheet material 20 is determined by the sensors 10 which are a part of an overall fluidic control system generally indicated by the reference number 21. The system 21 may, for example, include a fluid source 22, such as an air compressor, which delivers air to the sensors 10 at a pressure of between 7 psig to 20 psig. The sensors 10 send a signal through a fluidic amplifier 23, which is in communication with one or more logic gates 24 and a control means 25. Fluidic amplifiers and logic gates are, of course, well known in the prior art. The logic gates 24 may consist of various types, for example where a multiplicity of sensors 10 are utilized in the fluid control system 21, the logic gates may be of the OR/NOR or AND/NAND types.

The control means 25 may be a fluidic device, a hydraulic device, or an electronic device which is operatively connected to the drive means 16. In operation, the fluid control system 21 provides an override circuit which prevents actuation of the drive means 16 if the sheet material 20 is not properly positioned upon the die of the bed 12 of the press 11.

The fluidic sensor 10 includes a body 28 which in the present embodiment is rectangular in configuration. The body 28 has a longitudinally extending external front surface 29, a fluid inlet port 30 and a fluid outlet port 31. In the present embodiment, an inlet fitting 32 is positioned at the fluid inlet port 30 and an outlet fitting 33 is positioned at the fluid outlet port 31. The fittings 32 and 33 are adaptable to receive, for example, air hoses.

Figure 4:
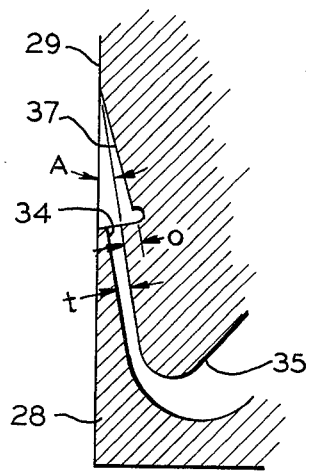
FIG. 4 is a diagrammatic view showing the emitter port or nozzle portion of the FIG. 2 fluidic sensor, shown on an enlarged scale.

An emitter port or nozzle 34 is defined in the body 28 adjacent a lower portion of the surface 29. The emitter port 34 is in communication with the fluid inlet port 30 through a fluid passageway 35. Referring to FIGS. 3 and 4, the emitter port 34 is inclined at an acute angle A with respect to the surface 29 of the body 28. Preferably, the angle A may vary between 12° and 15°. It has been found that if the nozzle 34 has a width of 0.125 inch, the optimum nozzle is rectangular in configuration having a thickness ($t$) between 0.025 inch and 0.035 inch. Circular nozzle shapes are not satisfactory.

In the present embodiment, a recess 37 is defined in the body 28 adjacent the emitter port 34 and a receiver port 38 is defined by the body 28 adjacent the upper portion of the surface 29. The recess 37 includes an offset distance ($o$) which is found to be optimum in the region of $1t$ to $1.5t$, where "$t$" is the thickness of the nozzle 34 (see FIG. 4). The receiver port 38 is in communication with the fluid outlet port 31 by way of a fluid passageway 39.

A slot 40 is defined by the body 28 adjacent the receiver port 38. The slot 40 is in fluid communication with a cavity 41. The slot 40 and the cavity 41 form a pressure drop chamber. The width of the slot 40 is preferably between 0.025 inch and 0.040 inch or from $1t$ to $1.6t$, where $t$ is the thickness of the nozzle 34. The length of the slot 40 should be between $6t$ and $10t$. The diameter of the cavity 41 may, for example, be between $7t$ and $10t$. A cusp 42 is defined by the body 28 at the upper edge of the receiver port 38. The cusp 42 may have either a flat surface or a concave surface.

Figure 5:
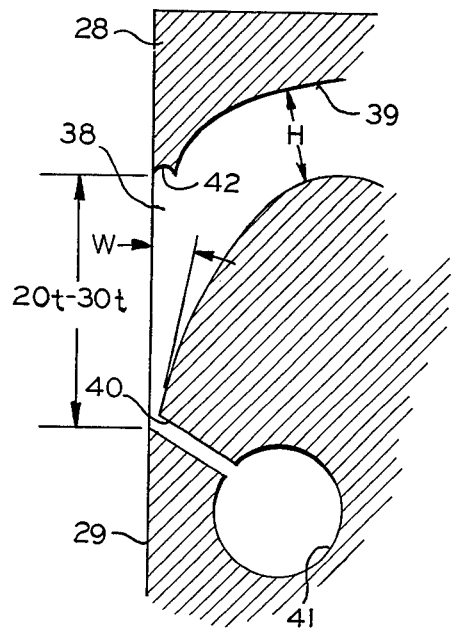
FIG. 5 is a diagrammatic view similar to FIG. 4 showing the receiver port.

Referring to FIG. 5, the opening of the receiver port 38 preferably varies between $20t$ and $30t$ for satisfactory pressure recover in the fluid passageway 39.

The receiver port 38 defines a wall angle "$w$" which varies in the range of 6° to 12° and then changes direction as a spiral curve.

The heighth H of the passageway 39 is approximately $10t$ to $15t$, while the heighth of the receiver port at the surface 29 is approximately $20t$ to $30t$.

FIGS. 8-11 are diagrammatic representations of the air flow conditions which occur when utilizing the fluidic sensors. The air flow paths shown in FIGS. 8-11 are by way of example only and reflect a simplified showing of the inventor's analysis of complicated flow patterns.

Referring to FIG. 3, the target area of the fluid flow of the fluidic sensor 10 includes a sensing gap B and a sensing range C. It has been found that the sensing range C, which sets the vertical limits for sensing the sheet 20, is far greater than many prior art sensing devices. The sensing gap B is the horizontal sensitivity distance. It should be noted that the sensitivity of the sensing range C is generally parobolic in configuration with the greatest sensitivity being centrally located between the emitter port 34 and receiver port 38.

EXAMPLE A

A fluid sensor, as shown in FIG. 2, was operated at a supply pressure of 18 p.s.i. and at a flow rate of 0.67 c.f.m. The sensor was 3 inches long and the distance along the surface 29 between the emitter port or nozzle 34 and the receiver port 38 was 1.875 inches. The sensing gap B was determined at intervals of ⅛ inch beginning at the receiver port 38 and continuing to the emitter port 34.

| Distance from port 38 on surface 29 | Sensing Gap (B) (Inches × $10^{-3}$) |
| --- | --- |
| 0 | 46 |
| .125 | 55 |
| .250 | 76 |
| .375 | 83 |
| .500 | 83 |
| .625 | 83 |
| .750 | 83 |
| .875 | 82 |
| 1.000 | 82 |
| 1.125 | 82 |
| 1.250 | 82 |
| 1.375 | 82 |
| 1.500 | 66 |
| 1.625 | 65 |
| 1.750 | 46 |
| 1.875 | 27 |

EXAMPLE B

A fluid sensor, as shown in FIG. 2, was operated at a supply pressure of 44 p.s.i. and at a flow rate of 0.67 c.f.m. The sensor was 3.625 inches long and the distance along the surface 29 between the emitter port or nozzle 34 and the receiver port 38 was 2.375 inches. The sensing gap B was determined at intervals of ⅛ inch beginning at the receiver port 38 and continuing to the emitter port 34.

| Distance from port 38 on surface 29 | Sensing Gap (B) (Inches × $10^{-3}$) |
| --- | --- |
| 0 | 24 |
| .125 | 42 |
| .250 | 58 |
| .375 | 70 |
| .500 | 75 |
| .625 | 83 |
| .750 | 83 |
| .875 | 83 |
| 1.000 | 83 |
| 1.125 | 85 |
| 1.250 | 85 |
| 1.375 | 85 |
| 1.500 | 83 |
| 1.625 | 83 |
| 1.750 | 66 |
| 1.875 | 62 |
| 2.000 | 42 |
| 2.175 | 38 |
| 2.250 | 18 |
| 2.375 | 15 |

It is apparent that a wide sensing range C is provided by a fluidic sensor, according to the present invention and that the sensing gap B is rather uniform along an extended portion of the surface 29.

Figure 8:
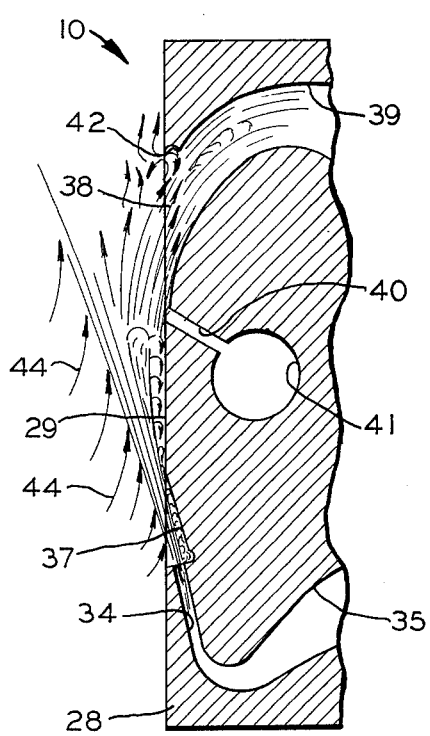
FIG. 8 is a diagrammatic view of the fluidic sensor shown in FIGS. 2 and 3 and more particularly showing the air stream when no object is adjacent the sensor.

Referring to FIG. 8, which is the theoretical air flow of the sensor 10 with no object interposed into the air flow, air under pressure in transmitted through the fluid passageway 35 and discharged through the emitter port 34. As mentioned above, the discharge pressure of the air is normally between 7 psig and 20 psig. The recess 37 forms a low pressure area and the fluid discharged from the emitter port 34 has a tendency to cling to the surface 29. As the stream moves upwardly, the bulk of the air stream remains against the surface 29. At the same time, ambient air indicated by the arrows 44 is induced and entrained by the air stream. The slot 40 and cavity 41 form a pressure drop which urges the air stream into the receiver port 38. In the present embodiment, the cusp 42 also guides a portion of the air stream into the receiver port 38. Enough of the air stream enters the port 38 and the fluid passageway 39 to energize the downstream portion of the fluidic control system 21. Normally, a pressure equal to one-half inch water is sufficient for this purpose.

Figure 9:
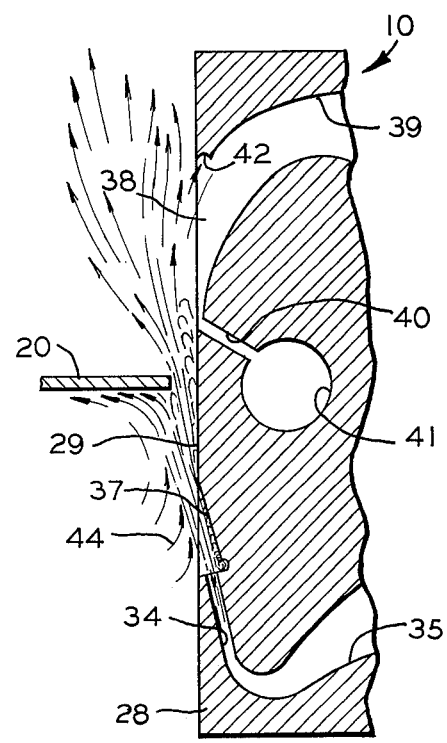
FIG. 9 is a view similar to FIG. 8 and particularly showing the air stream when an object is in proximity with the fluidic sensor.

FIG. 9 indicates the air flow path after the sheet material 20 is in proximity with the surface 29 of the fluidic sensor 10. The core stream velocity increases in the gap between the surface 29 and the edge of the sheet material 20. On re-emerging from the gap, the air stream is bent away from the face surface 29. Once the air stream is bent, the pressure within the fluid passageway 39 exhausts and the upstream logic gates 24 switch, sensing a signal to the control means 25 and thence to the drive means 16.

Figure 6:
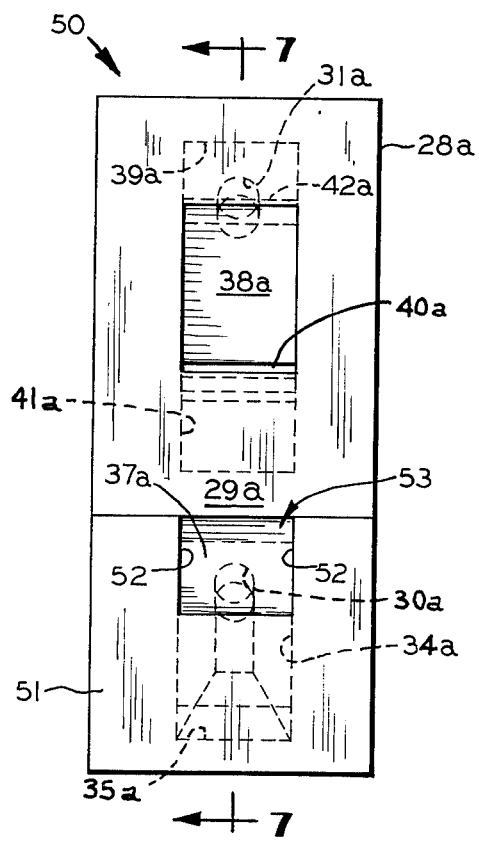
FIG. 6 is a front end view, similar to FIG. 2, showing another embodiment of a fluidic sensor, according to the present invention.
Figure 7:
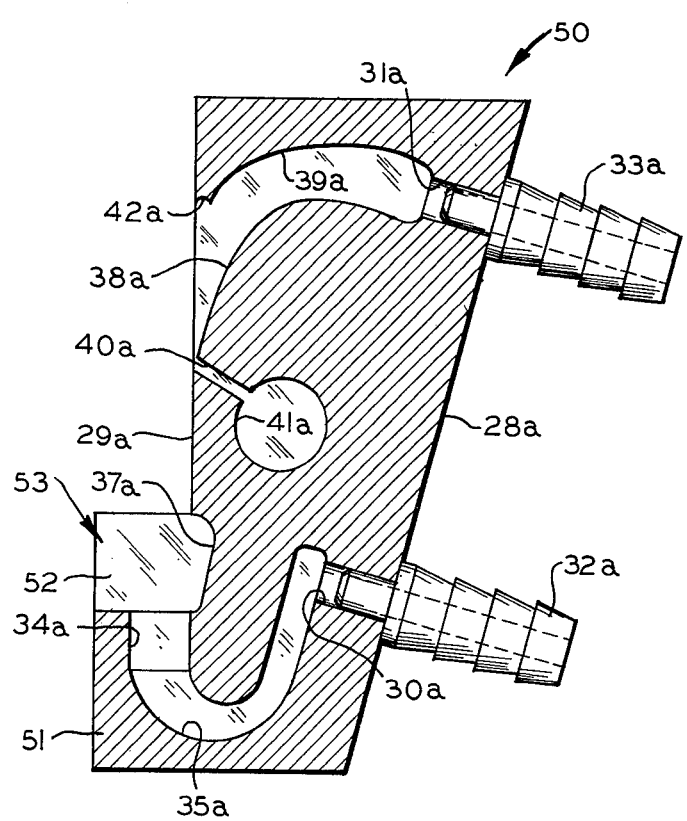
FIG. 7 is a sectional view taken along the line 7—7 of FIG. 6.

Referring to FIGS. 6 and 7, another embodiment of a fluidic sensor, according to the present invention, is generally indicated by the reference number 50. The fluidic sensor 50 includes a body 28a having a surface 29a. The body 28a includes a forward leg 51 extending outwardly adjacent the lower portion of the surface 29a. The leg 51 includes spaced opposed wings or shoulders 52.

The body 28a defines a fluid inlet port 30a and a fluid outlet port 31a. The fluid inlet port 30a and the fluid outlet port 31a are provided with an inlet fitting 32a and an outlet fitting 33a, respectively. An emitter port 34a is defined by the leg 51 of the body 28a adjacent a lower portion of the surface 29a. The emitter port 34a is in fluid communication with the fluid inlet port 30a by means of a fluid passageway 35a. A recess 37a is defined in the body 28a adjacent the emitter port 34a. The opposed wings 52 and the surface 29a of the body 28a form a pocket 53 above the emitter port 34a.

A receiver port 38a is defined by the body 28a adjacent the upper portion of the surface 29a. The receiver port 38a is in fluid communication with the outlet port 31a by means of a fluid passageway 39a. A slot 40a leading to a cavity 41a is defined by the body 28a at the lower edge of the receiver port 38a. The slot 40a and cavity 41a form a pressure drop chamber in the fluidic sensor 50. A curvic depression or cusp 42a is defined at the upper edge of the receiver port 38a. The cusp 42a may have either a flat surface or a concave surface.

Figure 10:
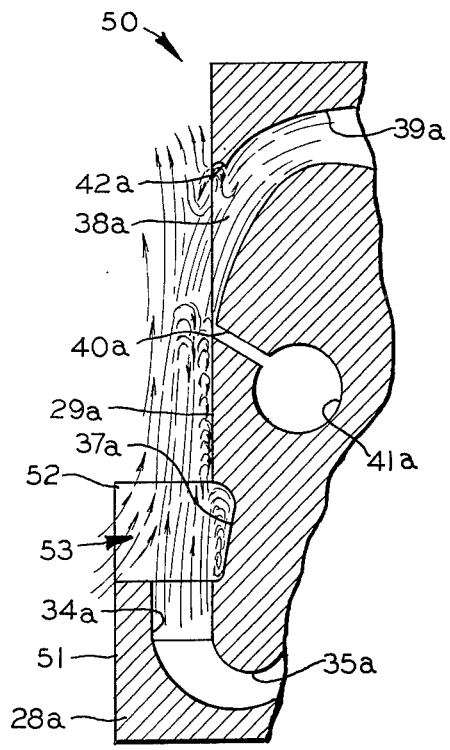
FIG. 10 is a view of the fluidic sensor shown in FIGS. 6 and 7 and particularly showing the air stream when no object is adjacent the sensor.

Referring to FIG. 10, air under pressure is discharged from the emitter port or nozzle 34a. The pocket 53 and the recess 37a create a low pressure region, similar to a low pressure region formed by the recess 37 in the FIG. 2 embodiment. Because the side opposite the surface 29a of the pocket 53 is open to atmosphere, the air stream entrains ambient air and causes a pressure differential across the stream. The pressure differential urges the stream to hug the surface 29a. It has been found that the air stream hugging the flat face surface 29a is made up of a central core having an extremely high velocity together with a lower velocity envelope of air surrounding the high velocity core. As the air stream moves upwardly, there is more air retardation at the face or surface 29a than at the outer envelope edge contiguous with the surrounding atmosphere, therefore, the core stream curls toward the surface continuously. The curling causes a pressure drop and the air stream tends to hug the surface 29a as it moves upwardly.

As the air stream approaches the open receiver port 38a, the pressure drop chamber defined by the slot 40a and cavity 41a cause a pressure drop across the air stream and a part of the air stream is diverted into the receiver 38a. Another portion of the air stream slightly farther away from the surface 29a impinges on the cusp 42a located at the upper end of the receiver port 38a. A portion of the air stream striking the cusp is diverted into the receiver port 38a while another portion is diverted away from the receiver port 38a. The part of the air stream that is diverted into the receiver port 38a begins to change some of its kinetic energy into potential energy. This potential energy is sufficient to energize the downstream logic gates 24.

Figure 11:
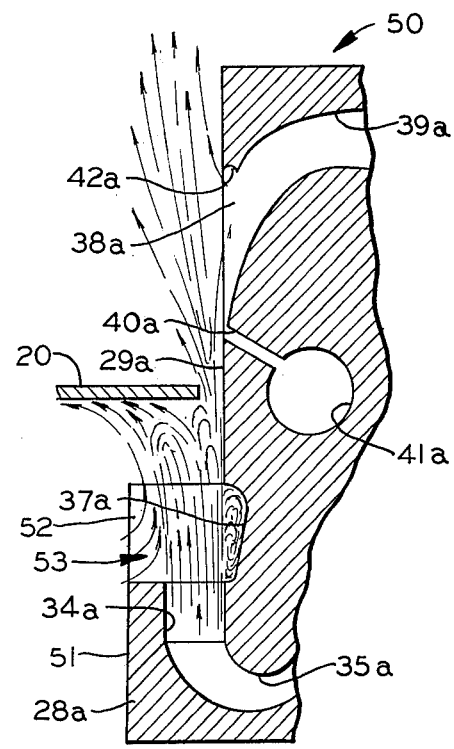
FIG. 11 is a view similar to FIG. 10 showing the air stream when an object is in proximity with the fluidic sensor.

FIG. 11 shows the theoretical position of the air stream after the sheet material 20 is moved into proximity with the surface 29a. As the air stream moves through the gap between the sheet material 20 and the surface 29a, the re-emerging stream is bent away from the surface 29a. Once the air stream is bent, the fluid passageway 39a exhausts and the downstream logic gates 24 are switched.

It has been found that fluid sensors, according to the present invention, provide excellent proximity sensors when working with material of various configurations and particularly with sheet materials. The fluidic sensors, according to the present invention, provide a much greater range and flexibility than was present in most prior art devices and in addition have a geometrical configuration which does not interfere with, for examples, press operations.

What I claim is:

1. A fluidic sensor comprising:
   a. a sensor body having a fluid inlet port, a fluid outlet port and a generally planar external face;
   b. an emitter port in communication with said inlet port, said emitter port being defined within the body adjacent the planar face and oriented so as to discharge fluid at an acute angle outwardly from said planar face;
   c. a receiver port in communication with said outlet port and said planar face, said receiver port being spaced along said planar face from said emitter port in a direction, generally corresponding to the discharge from said emitter port;
   d. a recess in said planar face adjacent said emitter
   e. a pressure drop chamber in said body in communication with said planar face between said emitter and receiver ports and adjacent said receiver port; and
   f. a cusp in said receiver port on the side thereof opposite said emitter port and adjacent said planar face, said emitter port, receiver port, pressure drop chamber and cusp being positioned with respect to said planar face to normally guide a portion of the fluid flow from said emitter port into the receiver port in the absence of an external interference 2. The fluidic sensor of claim 1 wherein said pressure drop, chamber is defined by a cavity within said body and a slot communicating between said cavity and said planar surface.

3. The fluidic sensor of claim 1 wherein said emitter port is at an angle of about 12° to 15° with respect to said face.

4. The fluidic sensor of claim 1 wherein said emitter port has a thickness $t$ measured generally perpendicular to said face and said recess extends into said face by a distance of from about $t$ to $1.5t$.

5. The fluidic sensor of claim 1 wherein said emitter port has a thickness $t$ measured generally perpendicular to said face and said receiver port has an opening in said face measured along a line connecting said emitter and said receiver ports of from $20t$ to $30t$.

6. The fluidic sensor of claim 1 wherein said cusp comprises a concave surface in said receiver port and adjacent said face.

* * * * *